(12) United States Patent
Suzuki et al.

(10) Patent No.: US 11,454,519 B2
(45) Date of Patent: Sep. 27, 2022

(54) ROTATION DETECTION DEVICE

(71) Applicant: DENSO CORPORATION, Kariya (JP)

(72) Inventors: Takahiro Suzuki, Kariya (JP); Masaya Taki, Kariya (JP); Toshihiro Fujita, Kariya (JP)

(73) Assignee: DENSO CORPORATION, Kariya (JP)

( * ) Notice: Subject to any disclaimer, the term of this patent is extended or adjusted under 35 U.S.C. 154(b) by 580 days.

(21) Appl. No.: 16/423,497

(22) Filed: May 28, 2019

(65) Prior Publication Data

US 2019/0368894 A1 Dec. 5, 2019

(30) Foreign Application Priority Data

May 30, 2018 (JP) .............................. JP2018-103868

(51) Int. Cl.
*G01D 5/12* (2006.01)
*B62D 5/04* (2006.01)
(Continued)

(52) U.S. Cl.
CPC .............. *G01D 5/12* (2013.01); *B62D 5/049* (2013.01); *G01D 5/24485* (2013.01);
(Continued)

(58) Field of Classification Search
CPC .. G01D 5/12; G01D 2205/26; G01D 5/24485; G01D 5/145; G01D 5/16; B62D 5/049; B62D 5/0484; B62D 5/046
See application file for complete search history.

(56) References Cited

U.S. PATENT DOCUMENTS 4,926,960 A * 5/1990 Ishikura ............... B62D 5/0463
701/41
5,913,913 A * 6/1999 Okanoue .............. B62D 5/0484
180/404
(Continued)

FOREIGN PATENT DOCUMENTS

JP 2003276635 A 2/2003
JP 2003-315099 A 11/2003
(Continued)

OTHER PUBLICATIONS

U.S. Appl. No. 16/423,481, filed May 28, 2019, May 28, 2019, Takahiro Suzuki.
(Continued)

*Primary Examiner* — Tung S Lau
(74) *Attorney, Agent, or Firm* — Maschoff Brennan

(57) ABSTRACT

An electric power steering apparatus has a rotation detection device that can recover from abnormalities in calculating an absolute angle. The rotation detection device includes a signal acquirer that acquires a mechanical angle and a count value from a sensor, and an absolute angle calculator that calculates an absolute angle based on the mechanical angle and the count value. The rotation detection device further includes an abnormality determiner that determines abnormalities in the calculation of the absolute angle. The absolute angle calculator stores an absolute angle hold value prior to the detection of the abnormality the absolute angle. When the abnormality of the absolute angle is resolved, the absolute angle calculator calculates a recovery-time absolute angle, and returns to a normal-time absolute angle calculation.

8 Claims, 10 Drawing Sheets

(51) Int. Cl.
  *G01D 5/244*  (2006.01)
  *G01D 5/16*   (2006.01)
  *G01D 5/14*   (2006.01)
(52) U.S. Cl.
  CPC .............. *G01D 5/145* (2013.01); *G01D 5/16* (2013.01); *G01D 2205/26* (2021.05)

(56) References Cited

U.S. PATENT DOCUMENTS

| | | | | |
|---|---|---|---|---|
| 6,644,433 | B2* | 11/2003 | Sato | B62D 5/0487 701/41 |
| 2004/0188172 | A1* | 9/2004 | Asada | B62D 5/0484 180/446 |
| 2004/0193344 | A1* | 9/2004 | Suzuki | B62D 5/0484 701/41 |
| 2005/0135035 | A1 | 6/2005 | Tsutsui | |
| 2008/0078608 | A1* | 4/2008 | Hara | B62D 15/0235 180/446 |
| 2008/0294313 | A1* | 11/2008 | Aoki | B62D 5/0463 701/43 |
| 2010/0094507 | A1* | 4/2010 | Mitsuhara | B62D 15/0215 701/42 |
| 2014/0045636 | A1* | 2/2014 | Sasaki | F16H 1/321 475/169 |
| 2015/0239501 | A1 | 8/2015 | Fujita et al. | |
| 2016/0288823 | A1* | 10/2016 | Mikamo | B62D 5/049 |
| 2017/0291640 | A1 | 10/2017 | Fujita et al. | |
| 2018/0022379 | A1* | 1/2018 | Sasaki | B62D 5/0448 701/41 |
| 2018/0229761 | A1 | 8/2018 | Fujita et al. | |
| 2019/0291775 | A1 | 9/2019 | Taki et al. | |

FOREIGN PATENT DOCUMENTS

| | | |
|---|---|---|
| JP | 2005-345375 A | 12/2005 |
| JP | 5958572 B2 | 8/2016 |
| JP | 2017191092 A | 10/2017 |
| JP | 2017191093 A | 10/2017 |
| JP | 2018128429 A | 8/2018 |
| JP | 2019164127 A | 9/2019 |
| WO | WO 2019/181938 A1 | 9/2019 |

OTHER PUBLICATIONS

U.S. Appl. No. 16/423,478, filed May 28, 2019, May 28, 2019, Toshihiro Fujita.
U.S. Appl. No. 16/530,091, filed Aug. 2, 2019, Aug. 2, 2019, Toshihiro Fujita.

* cited by examiner

ROTATION DETECTION DEVICE

CROSS REFERENCE TO RELATED APPLICATION

The present application is based on and claims the benefit of priority of Japanese Patent Application No. 2018-103868, filed on May 30, 2018, the disclosure of which is incorporated herein by reference.

TECHNICAL FIELD

The present disclosure relates to a rotation detection device and an electric power steering apparatus using the rotation detection device.

BACKGROUND INFORMATION

A rotation angle detection device may detect a rotation position of a motor. More specifically, the rotation angle detection device may detect information that varies with the rotation of the motor.

Abnormalities may occur during the rotation detection by the rotation angle detection device. As such, rotation angle detection devices are subject to improvement.

SUMMARY

The present disclosure describes a rotation detection device and an electric power steering apparatus using the rotation detection device. The rotation detection device of the present disclosure is configured to recover from an abnormality affecting the rotation detection device.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
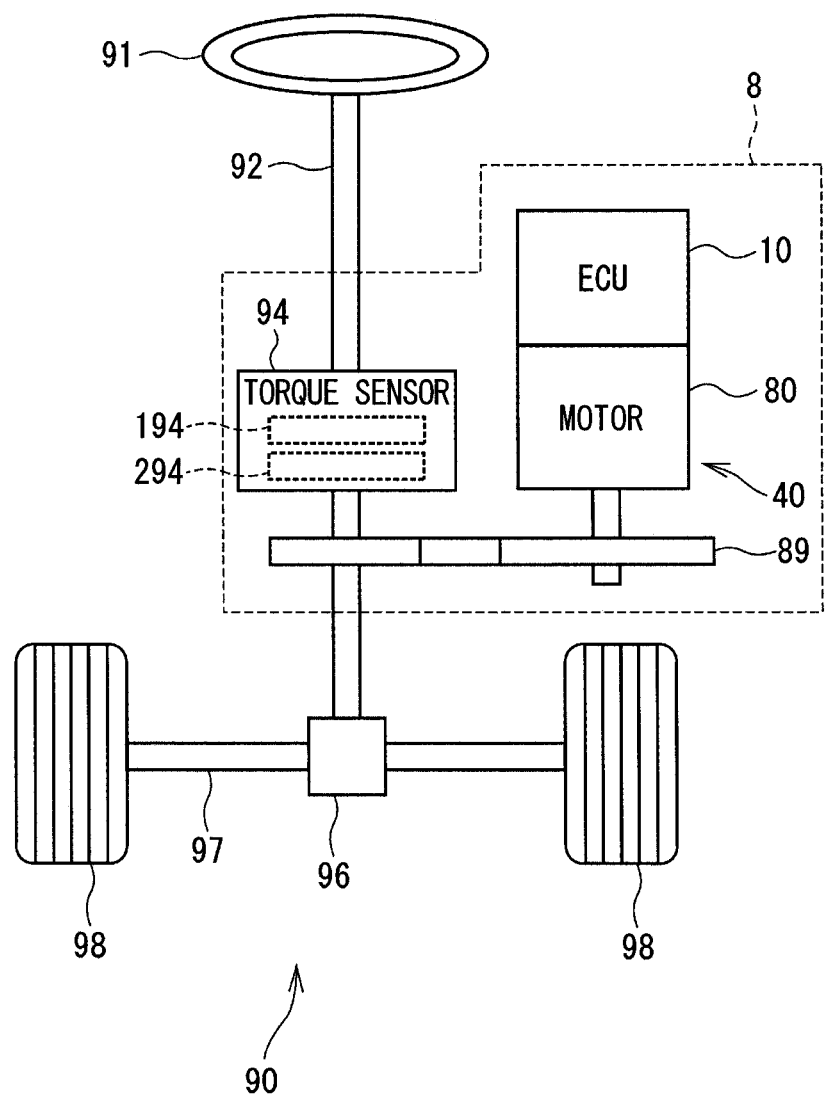
FIG. 1 illustrates a schematic configuration of a steering system according to a first embodiment.

The rotation angle detection device may detect information that varies with the rotation of a motor.

During rotation detection, a temporary abnormality in the rotation angle detection device may occur due to noise affecting the communication between the rotation angle sensor and the control unit (e.g., signal noise), and the temporary abnormality may later diminish to return the rotation angle detection device to a normal state. However, there may be problems in how related technology rotation angle detection devices recover from such abnormalities and return to a normal state after the detection of such abnormalities.

The present disclosure describes a rotation detection device and an electric power steering apparatus using the rotation detection device. The rotation detection device of the present disclosure is configured to recover from an abnormality affecting the rotation detection device.

When an abnormality occurs in the calculation of an absolute angle by a subject system, which is one of two systems in the rotation detection device, an absolute angle calculator may use a stored value of an absolute angle calculated before the detection of abnormality. When the absolute angle abnormality is resolved, the rotation detection device recovers from the abnormality and returns to a normal state, and the absolute angle calculation returns to the normal state (i.e., returns to a normal-time absolute angle calculation) after calculating a recovery-time absolute angle. As a result, after a temporary abnormality occurs in the rotation detection device/electric power steering (EPS) apparatus, the rotation detection device/EPS apparatus can appropriately recover from the abnormality and return to the normal state.

First Embodiment

A rotation detection device and an electric power steering apparatus using such a rotation detection device are described below with reference to the drawings. In the following embodiments, like features and elements among the embodiments may be referred to by the same reference numerals, and a repeat description of previously described like features and elements may be omitted from the descriptions of the latter embodiments.

With reference to FIG. 1, an electronic control unit (ECU) 10 is configured as a rotation detection device in the first embodiment. The ECU 10 is included with a motor 80 as part of an electric power steering apparatus 8 for assisting with a steering operation of a vehicle. The motor 80 may also be referred to as a rotating electric machine. FIG. 1 shows an overall configuration of a steering system 90 including the electric power steering apparatus 8. The steering system 90 includes a steering wheel 91, a steering shaft 92, a pinion gear 96, a rack shaft 97, road wheels 98, and the electric power steering apparatus 8.

The steering wheel 91 is disposed at one end of the steering shaft 92 and connected to the steering shaft 92. A torque sensor 94 is included on the steering shaft 92 to detect a steering torque Ts. The torque sensor 94 includes a first torque detector 194 and a second torque detector 294. The pinion gear 96 is disposed at the other end of the steering shaft 92. The pinion gear 96 engages with the rack shaft 97.

Road wheels 98 are coupled at both ends of the rack shaft 97 via a mechanical linkage such as tie rods.

When a driver of the vehicle rotates the steering wheel 91, the steering shaft 92 connected to the steering wheel 91 rotates. The pinion gear 96 converts the rotational motion of the steering shaft 92 into a linear motion for linearly moving the rack shaft 97. The road wheels 98 are steered to an angle corresponding to the displacement amount of the rack shaft 97.

The electric power steering apparatus 8 includes a drive device 40, which includes the motor 80, the ECU 10, and a speed-reduction gear 89. The speed-reduction gear 89 is a power transmission mechanism that reduces the rotation speed of the motor 80 and transmits the rotation to the steering shaft 92. The electric power steering apparatus 8 of the present embodiment is a column assist-type power steering apparatus. However, the electric power steering apparatus 8 is not limited to being a column assist-type electric power steering apparatus 8, and the electric power steering apparatus 8 may alternatively be a rack assist-type electric power steering apparatus 8 that transmits the rotation of the motor 80 to the rack shaft 97.

The motor 80 outputs an assist torque to assist with a steering operation. In other words, the motor 80 may either provide a whole or partial assist to assist a vehicle user in turning the steering shaft 92 to steer the road wheels 98.

Figure 2:
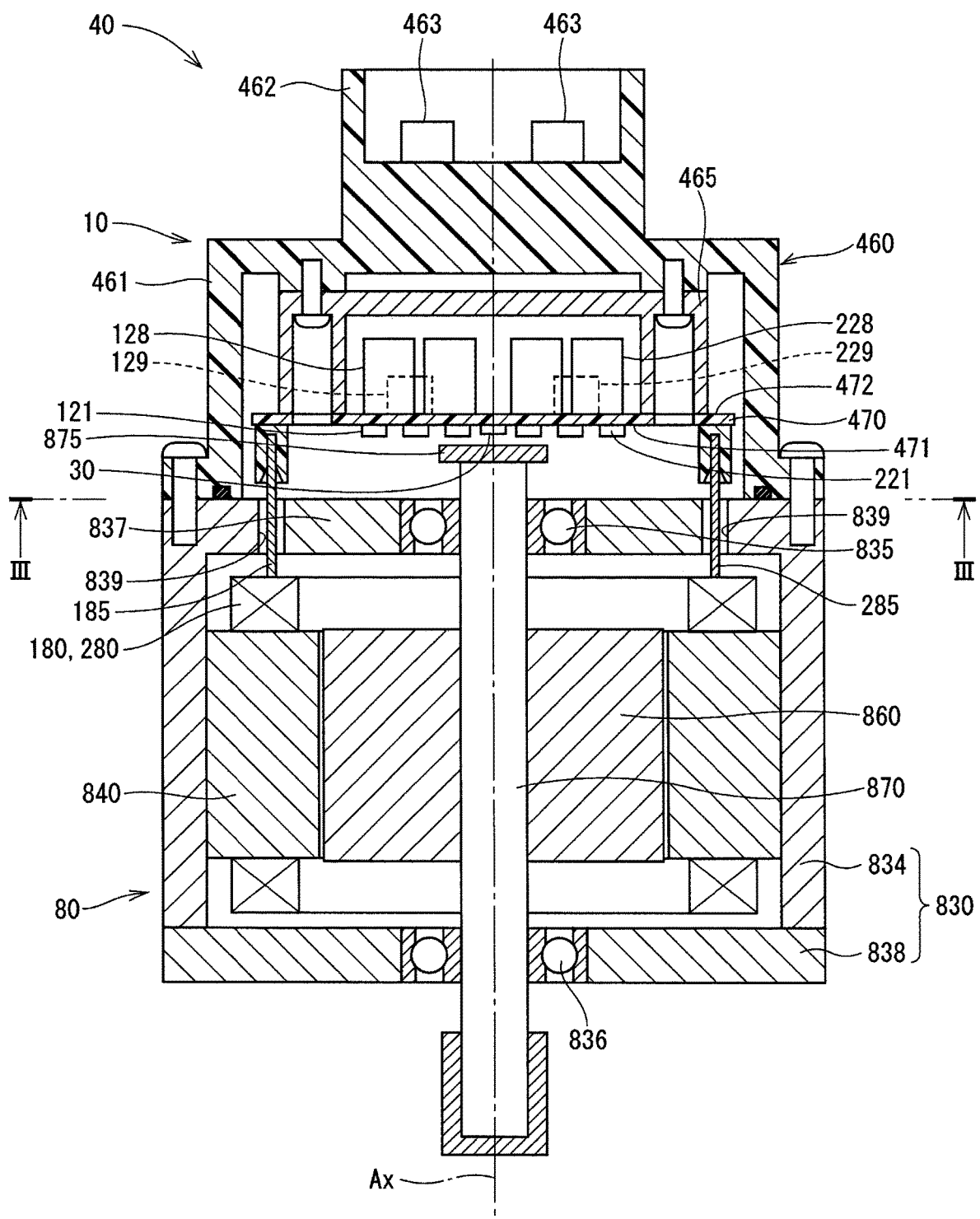
FIG. 2 illustrates a cross-sectional view of a drive device in the first embodiment.
Figure 3:
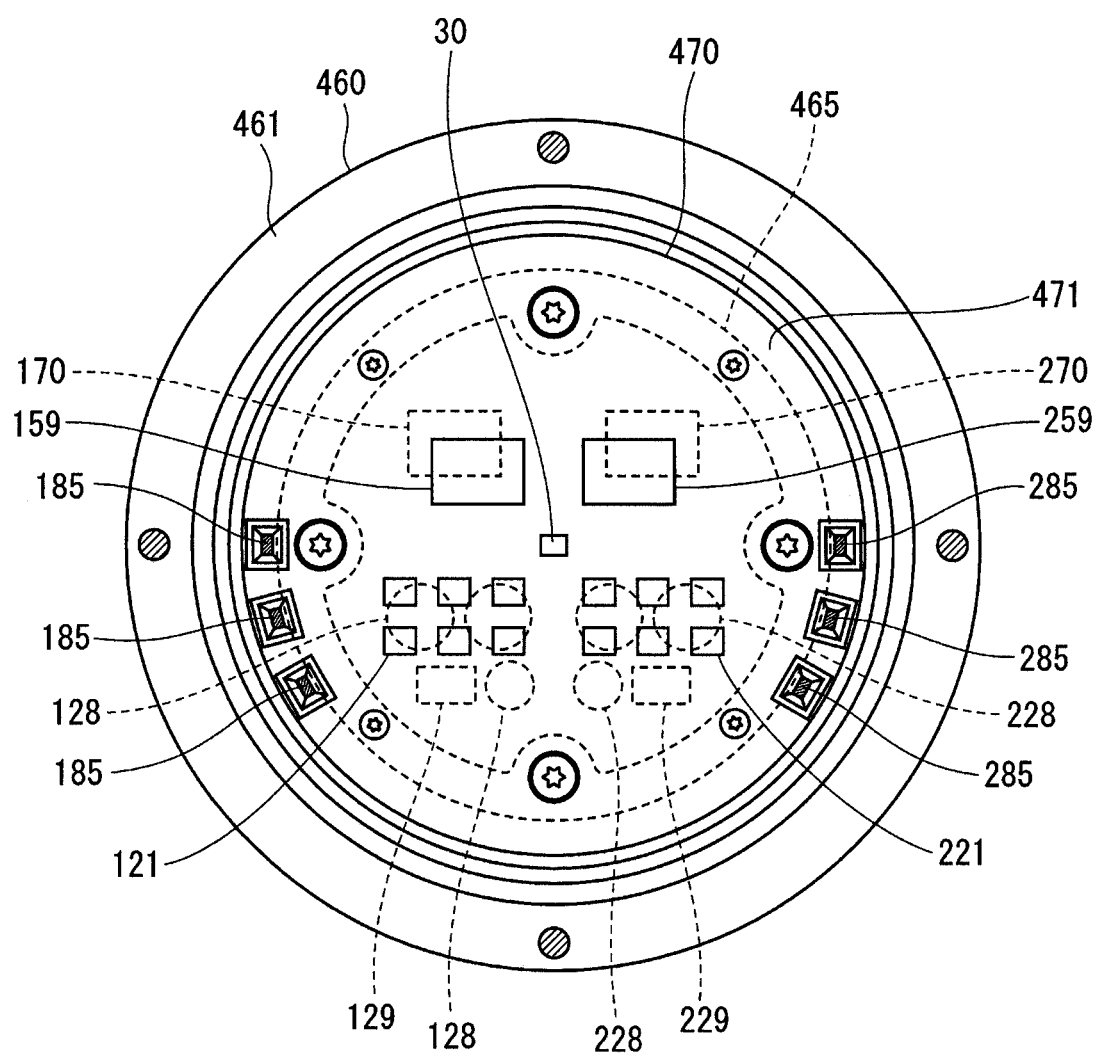
FIG. 3 illustrates a cross-sectional view of the drive device taken along a line III-III in FIG. 2.

The motor 80 is shown in greater detail in FIGS. 2 and 3. The motor 80 is driven by electric power supplied from batteries 191 and 291 shown in FIG. 4 as a direct current power supply. Driving the motor 80 in forward and reverse directions causes the speed-reduction gear 89 shown in FIG. 1 to respectively rotate in forward and reverse directions. The motor 80 is a three-phase brushless motor and has a rotor 860 and a stator 840, as shown in FIG. 2.

The motor 80 has a first motor winding 180 as a first winding set, and a second motor winding 280 as a second winding set. The motor windings 180 and 280 have the same electrical characteristics. For example, the motor windings 180 and 280 are commonly wound on the stator 840 so that the phases of the winding 180 are shifted by an electrical angle of 30 degrees from the corresponding phases of the winding 280. As such, the phase currents (e.g., U phase, V phase, and W phase) are controlled to be supplied to the motor windings 180 and 280 such that the corresponding phase currents of the motor windings 180 and 280 have a phase difference φ of 30 degrees. By optimizing the current supply phase difference, the output torque is improved and the sixth-order torque ripple harmonic can be reduced. Supplying the current with a 30 degree phase difference φ among the corresponding phases of the motor windings 180 and 280 also averages the current, thereby advantageously maximizing the cancellation of noise and vibration. Since heat generation is also averaged, it is also possible to reduce errors in the torque value detection by the torque sensors 194 and 294, as the detected torque values may vary with temperature.

Figure 4:
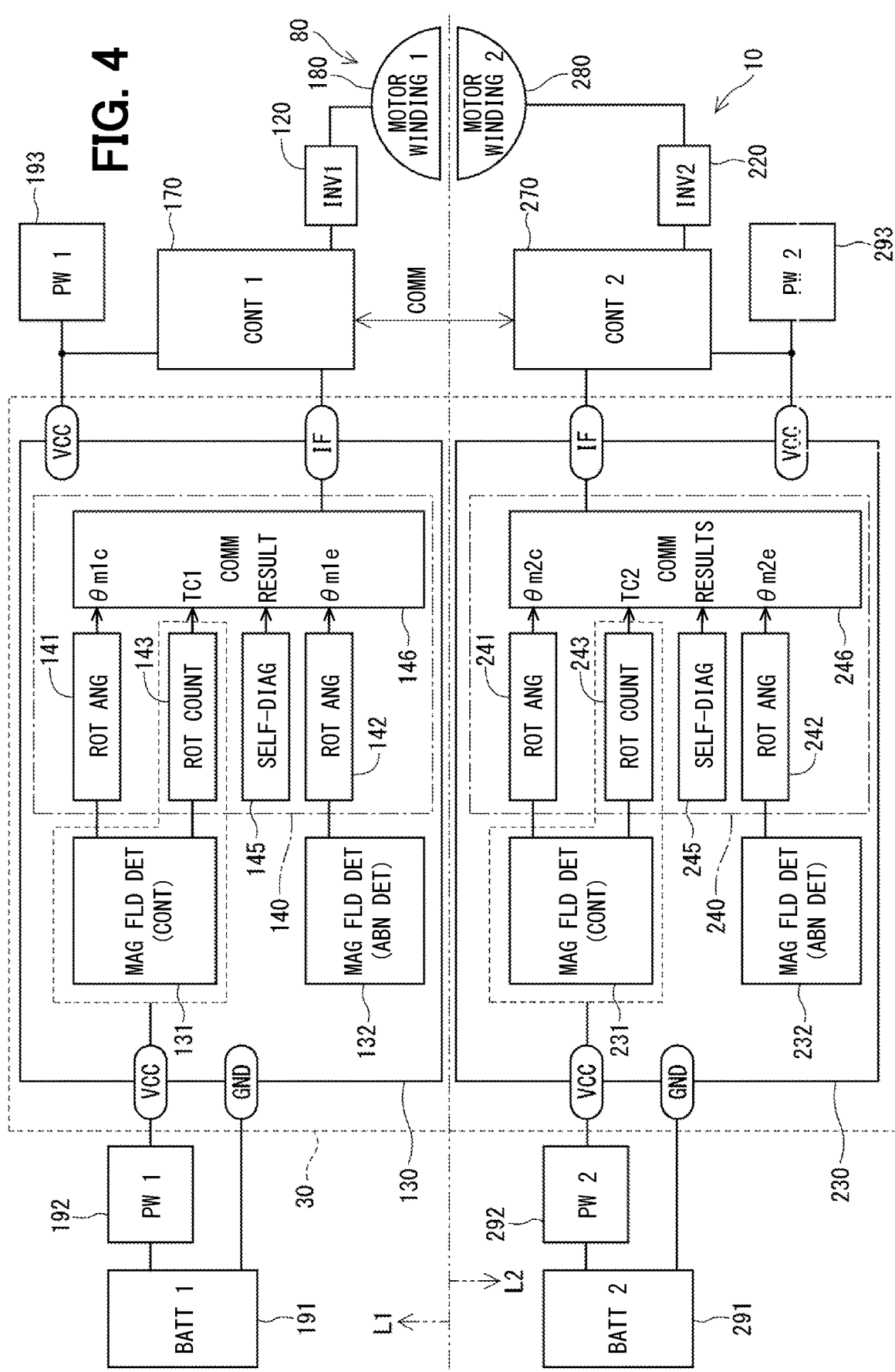
FIG. 4 illustrates a block diagram of an electronic control unit (ECU) in the first embodiment.

With reference to FIG. 4, the combination of a first driver circuit 120, a first sensor section 130, and a first control section 170, among other elements, may be referred to as a first system L1. The first system L1 is used to control the drive of the first motor winding 180 (e.g., by controlling the power supplied to the first motor winding 180). The combination of a second driver circuit 220, a second sensor section 230, and a second control section 270, among other elements, may be referred to as a second system L2. The second system L2 is used to control the drive of the second motor winding 280. Elements, components, and features included in the first system L1 may be indicated by reference numerals with a base of 100 (e.g., 120, 170), and the elements, components, and features included in the second system L2 may be indicated by reference numerals with a base of 200. Like elements and features between the first system L1 and second system L2 may be indicated by the least two significant digits. For example, the first control section 170 may be similar to the second control section 270 (e.g., the control sections 170 and 270 are like components), where the reference characters for each of the control sections 170 and 270 include "70" as their least significant digits, the prefix "1" (i.e., the most significant digit) for the first control section 170 indicates that the first control section 170 is included in the first system L1, and the prefix "2" indicates that the second control section 270 is included in the second system L2. The description of the first control section 170 and the second control section 270 may be similar, and in such case, a redundant description of like elements, components, and features may be omitted.

The drive device 40 may integrate the ECU 10 and the motor 80 together within a single package. As such, the drive device 40 may be referred to as a machine-electronics integrated-type drive device 40. As shown in FIG. 2, the ECU 10 may be disposed coaxially with the motor 80 at one end of the motor 80 along the longitudinal axis Ax (i.e., on an axial end of the motor 80). Alternatively, the motor 80 and the ECU 10 may be provided separately. The ECU 10 is positioned on the side opposite to the output of a shaft 870. Alternatively, the ECU 10 may be disposed on the output shaft side of the motor 80. By adopting the machine-electronics integrated-type configuration, the drive device 40 including the ECU 10 and the motor 80 may be installed in more restricted spaces (e.g., smaller, narrower spaces) in the vehicle.

The motor 80 includes the stator 840, the rotor 860, and a housing 830 that houses the stator 840 and the rotor 860 on the inside of the housing 830. The stator 840 is fixed to the housing 830, and the motor windings 180 and 280 are wound on the stator 840. The rotor 860 is disposed inside the stator 840. In other words, the stator 840 may surround the rotor 860. The rotor 860 can rotate relative to the stator 840.

The shaft 870 is fitted in the rotor 860 to rotate integrally with the rotor 860. The shaft 870 is rotatably supported by the housing 830 by bearings 835 and 836. The end portion of the shaft 870 on the ECU 10 side protrudes from the housing 830 toward the ECU 10. A magnet 875 is included at the axial end of the shaft 870 on the ECU 10 side.

The housing 830 includes a cylindrical-shaped case 834 with a rear frame end 837 that relatively closes the side of the case 834 near the ECU 10. A front frame end 838 is included and attached on the open side of the case 834 to relatively close the side of the case 834 near the output of the shaft 870. The case 834 and the front frame end 838 are fastened to each other by bolts or like fasteners (not shown). Lead wire insertion holes 839 are formed in the rear frame end 837. Lead wires 185 and 285 connected to each phase of the motor windings 180 and 280 are inserted through the lead wire insertion holes 839. The lead wires 185 and 285 pass through the lead wire insertion holes 839 toward the ECU 10 and connect to a circuit board 470.

The ECU 10 includes a cover 460, a heat sink 465, the circuit board 470, and other electronic components mounted on the circuit board 470. The heat sink 465 may be fixed to the cover 460, and the circuit board 470 may be fixed to the heat sink 465.

The cover 460 protects the electronic components of the ECU 10 from external impacts and prevents the ingress of dust and water into the inside of the ECU 10. The cover 460 includes an integrally formed cover main body 461 and a connector member 462. The connector member 462 and the cover main body 461 need not be integrally formed and may be alternatively included as two separate structural members 461 and 462. The terminals 463 of the connector member 462 are connected to the circuit board 470 via wiring or like electrical conductors (not shown). The number of connector members 462 and the number of terminals may correspond to the number of electrical inputs and outputs (e.g., power, signals) to and from the ECU 10, as well as being based on other design factors. The connector member 462 is disposed at one axial end of the drive device 40 on the side opposite the motor 80. The connector member 462 extends axially away from the drive device 40 in the direction of the axis Ax and is open to allow for an external connector (not shown) to connect to the connector member 462.

The circuit board 470 is, for example, a printed circuit board, and is positioned with one side facing the rear frame end 837 toward the motor 80, and another side facing away from the motor 80 toward the cover 460. The electronic components of the first and second systems L1 and L2 shown in FIG. 4 are mounted independently on the circuit board 470 so that the two systems are provided in a fully redundant configuration. In the present embodiment, the electronic components of the first and second systems L1 and L2 are mounted on one circuit board 470, but the electronic components of the first and second systems L1 and L2 may be alternatively mounted on separate circuit boards. Not all of the electronic components from the first and second systems L1 and L2 may be mounted on the circuit board, and FIGS. 2 and 3 may not illustrate all of the electronic components shown in FIG. 4 as being on the circuit board 470. The electronic components from the first and second systems L1 and L2 on the circuit board 470 are described below in greater detail.

Of the two principal surfaces of the circuit board 470, the surface on the side of the motor 80 is referred to as a motor side surface 471 and the other surface facing the cover 460 is referred to as a cover side surface 472. As shown in FIG. 3, switching elements 121, switching elements 221, a rotation angle sensor 30, and custom integrated circuits (ICs) 159 and 259 are mounted on the motor side surface 471. The rotation angle sensor 30 is mounted at a position facing the magnet 875 so as to be able to detect a change in the magnetic field caused by rotation of the magnet 875. The rotation angle sensor 30 may be disposed centrally on the motor side surface 471 of the circuit board 470 as shown in FIG. 3 so that the rotation angle sensor is disposed coaxially with the shaft 870, and thus the magnet 875, along the axis Ax, for example, as shown in FIG. 2. The rotation angle sensor 30 may be referred to as the sensor section 30.

The switching elements 121 may make up part of the first driver circuit 120 shown in FIG. 4 (e.g., inverter 1). The switching elements 221 may make up part of the second driver circuit 220 shown in FIG. 4 (e.g., inverter 2).

Capacitors 128 and 228, inductors 129 and 229, and the control sections 170 and 270 are mounted on the cover side surface 472.

Small computers such as microcontrollers or systems on a chip (SoCs) may form control sections 170 and 270 with a separate computer forming each of the control sections 170 and 270. In other words, the control section 170 may be a microcontroller or SoC and the control section 270 may be another microcontroller or SoC. In FIG. 3, reference numerals 170 and 270 are assigned to the computers that are respectively part of the control sections 170 and 270.

The capacitors 128 and 228 respectively smooth electrical power from the batteries 191 and 291 shown in FIG. 4. The capacitors 128 and 228 also assist the electric power supply to the motor 80 by storing electric charge. The capacitors 128 and 228 and the inductors 129 and 229 may be configured to form a filter circuit. For example, the capacitor 128 and the inductor 129 may be combined to form an LC filter for the first system L1. The capacitor 228 and the inductor 229 may be combined to form an LC filter for the second system L2. The filter circuits reduce noise transmitted from other devices that share the batteries 191 and 291, and also reduce noise transmitted from the drive device 40 to the other devices sharing the batteries 191 and 291.

The power supply relays, motor relays, and current sensors (all not shown in the drawings) may also either be mounted on the motor side surface 471 or on the cover side surface 472.

As shown in FIG. 4, the ECU 10 includes the driver circuits 120 and 220, and the control circuits 170 and 270. In FIG. 4, the driver circuit is described as "INV." The first driver circuit 120 is a three-phase inverter having six switching elements 121. The first driver circuit 120 converts the electric power supplied to the first motor winding 180 (e.g., converts the direct current (DC) power from the battery 191 to an alternating current (AC) power). The switching elements 121 are controlled to turn on and off based on control signals from the first control section 170. The second driver circuit 220 is a three-phase inverter having six switching elements 221. The second driver circuit 220 converts the electric power supplied to the second motor winding 280. The switching elements 221 are controlled to turn on and off based on control signals from the second control section 270.

As shown in FIG. 4, the rotation angle sensor 30 includes the first sensor section 130 and the second sensor section 230. The first sensor section 130 outputs an output signal SGN1 to the first control section 170, and the second sensor section 230 outputs an output signal SGN2 to the second control section 270. That is, in the present embodiment, the first sensor section 130 is included in the first system L1, and the second sensor section 230 is included in the second system L2.

Unless described otherwise, the configurations of components and elements in the ECU 10, the rotation angle sensor 30, and the drive device 40, as described in the present embodiment, are the same for the latter embodiments.

The first sensor section 130 includes magnetic field detection units 131 and 132 and a signal processing unit 140. The second sensor section 230 includes magnetic field detection units 231 and 232 and a signal processing unit 240. Since the processes performed by the sensor sections 130 and 230 are the same, the description focuses on the details of the process performed by the first sensor section 130 and omits a similar description for the second sensor section 230.

The magnetic field detection units 131, 132, 231, and 232 are detection elements that detect changes in the magnetic field of the magnet 875 based on the rotation of the motor 80 (e.g., via the rotation of the rotor 860 and the shaft 870). A magnetoresistance (MR) sensor or a Hall sensor may be used, for example, as the magnetic field detection units 131, 132, 231, and 232. The magnetic field detection units 131, 132, 231, and 232 each have four sensor elements that output a cos+signal, a sin+signal, a cos−signal, and a sin−signal. The cos+signal, the sin+signal, the cos−signal, and the sin−signal, either collectively or individually, may refer to the sensor signal. Similarly, the sensor signal may refer to any or all of the cos+signal, the sin+signal, the cos−signal, and the sin−signal.

The signal process unit 140 includes rotation angle calculators 141 and 142, a rotation count unit 143, a self-diagnostic unit 145, and a communicator 146. The signal process unit 240 includes rotation angle calculators 241 and 242, a rotation count unit 243, a self-diagnostic unit 245, and a communicator 246.

The rotation angle calculator 141 calculates a mechanical angle θm1c based on the sensor signal from the magnetic field detection unit 131. The rotation angle calculator 142 calculates the mechanical angle θm1e based on the sensor signal from the magnetic field detection unit 132. The rotation angle calculator 241 calculates the mechanical angle θm2c based on the sensor signal from the magnetic field detection unit 231. The rotation angle calculator 242 calculates the mechanical angle θm2e based on the sensor signal from the magnetic field detection unit 232. The mechanical angles θm1c, θm1e, θm2c, and θm2e are calculated from the arc tangent of the cos+signal, the sin+signal, the cos−signal, and the sin−signal.

In the present embodiment, the mechanical angles θm1c and θm2c are respectively calculated based on the detection signals (i.e., sensor signals) from the magnetic field detection units 131 and 231 and are used for various calculations in the control sections 170 and 270. The calculated mechanical angles θm1e and θm2e are respectively based on the detection signals (i.e., sensor signals) of the magnetic field detection units 132 and 232 and are used to detect abnormalities by respectively comparing the mechanical angles θm1e and θm2e with the mechanical angles θm1c and θm2c. The magnetic field detection units 131 and 231 may be used for purposes of control and are configured "for control," and the magnetic field detection units 132 and 232 may be used for purposes of abnormality detection and are configured "for abnormality detection." Values calculated by the rotation angle calculators 141, 142, 241, and 242 may be any values that can be converted into mechanical angles.

The magnetic field detection units 131 and 231 for control and the magnetic field detection units 132 and 232 for abnormality detection may be the same type of magnetic field detection units or be different types. Since the magnetic field detection accuracy for abnormality detection may be much lower than the magnetic field detection accuracy for control, the detection accuracy of the magnetic field detection units 132 and 232 used for abnormality detection may be lower than the detection accuracy of the magnetic field detection units 131 and 231 used for control. By using different types of magnetic field detection devices for control and abnormality detection, the likelihood of the magnetic field detection units malfunctioning at the same time is decreased. When using the same magnetic field detection elements for the magnetic field detection 131, 132, 231, and 232, it may be possible to vary the layout and configuration of the magnetic field detection units or select detection elements from different manufacturing lots to decrease the possibility of malfunctions occurring at the same time. The calculation circuits of the rotation angle calculators 141, 142, 241, and 242 may be varied in a like manner to reduce the likelihood of circuit malfunctions occurring at the same time.

The rotation count unit 143 calculates a count value TC1 based on the signal from the magnetic field detection unit 131. The rotation count unit 243 calculates a count value TC2 based on the signal from the magnetic field detection unit 231.

Figure 7:
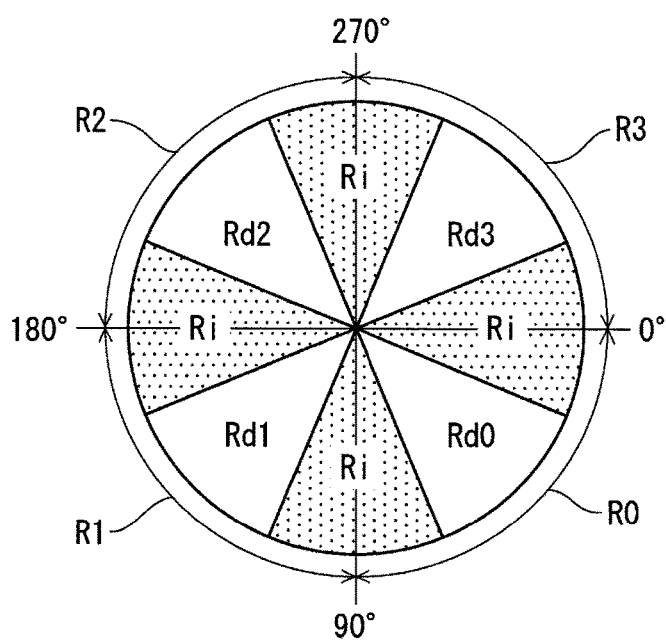
FIG. 7 illustrates definite regions and indefinite regions in the first embodiment.

As shown in FIG. 7, within one rotation of the motor 80, the mechanical angle θm takes a value of 0° to 360°. The rotation count units 143 and 243 may set four count regions based on the mechanical angle θm. In the present embodiment, the mechanical angle θm equal to or greater than 0° and less than 90° is referred to as "region R0," the mechanical angle θm equal to or greater than 90° and less than 180° is referred to as "region R1," the mechanical angle θm equal to or greater than 180° and less than 270° is referred to as "region R2," and the mechanical angle θm equal to or greater than 270° and less than 360° is referred to as "region R3." Each time the mechanical angle θm changes from one region to the other, the count values TC1 and TC2 either count up or down based on the rotation direction. In the present embodiment, the count values TC1 and TC2 count up when the motor 80 rotates in a forward direction, and count down when the motor 80 rotates in a reverse direction. That is, when the motor 80 makes one rotation in the forward direction, e.g., from 0° to 360°, the count values TC1 and TC2 respectively count up and increase by 4. When the motor 80 makes one rotation in the reverse direction, e.g., from 360° to 0°, the count values TC1 and TC2 respectively count down and decrease by 4.

As shown in FIG. 4, the self-diagnostic unit 145 monitors for abnormalities such as short circuits at the power source(s) or for ground faults in the first sensor section 130. The communicator 146 generates a first output signal SGN1 and transmits the first output signal SGN1 to the first control section 170. The first output signal SGN1 includes various signals such as the mechanical angles θm1c and θm1e, the count value TC1, and the self-diagnostic result. The first output signal SGN1 may include additional signals. The self-diagnostic unit 245 monitors for abnormalities in the second sensor section 230. The communicator 246 generates the second output signal SGN2 and transmits the second output signal SGN2 to the second control section 270. The second output signal SGN2 includes various signals such as the mechanical angles θm2c and θm2e, the count value TC2, and the self-diagnostic result. The second output signal SGN2 may include additional signals. The output signal of the present embodiment is a digital signal, and the communication method may use, for example, a serial peripheral interface (SPI) communication specification, but other communication methods may also be used.

Electric power is supplied from the first battery 191 to the first sensor section 130 via the power supplies 192 and 193. The power supplies 192 and 193 may be regulators or like controllers. Electric power is constantly supplied via the power supply 192 to the magnetic field detection unit 131 and the rotation count unit 143. The magnetic field detection unit 131 and the rotation count unit 143 are surrounded by a dashed line to indicate that these components are constantly supplied with power via the power source 192 and continued to be supplied with power for the purposes of continual detection and calculation even when the vehicle ignition switch is turned off. In the first sensor section 130, components other than the magnetic field detection unit 131 and the rotation count unit 143 are supplied with electric power via the power supply 193 when the vehicle ignition switch (not shown) is turned on. When the ignition switch is turned off, the power supply to these components is stopped. Electric power is also supplied to the first control section 170 via the power supply 193 when the ignition switch is turned on. The vehicle ignition switch may also be referred to as a start switch.

Electric power is supplied from the second battery 291 to the second sensor section 230 via the power supplies 292 and 293. Electric power is constantly supplied via the power supply 292 to the magnetic field detection unit 231 and the rotation count unit 243. The magnetic field detection unit 231 and the rotation count unit 243 are surrounded by a dashed line to indicate that these components are constantly supplied with power via the power source 292 and continued to be supplied with power for the purposes of continual detection and calculation even when the vehicle ignition switch is turned off. In the second sensor section 230, components other than the magnetic field detection unit 231 and the rotation count unit 243 are supplied with electric power via the power supply 293 when the vehicle ignition switch is turned on. When the ignition switch is turned off, the power supply to these components is stopped. Electric power is also supplied to the second control section 270 via the power supply 293 when the ignition switch is turned on.

A low power consumption element, such as a tunnel magnetoresistance (TMR) element may be used for the magnetic field detection units 131 and 231 that receive a continuous power supply. To simplify the description, detailed descriptions of some wiring and control lines, such as the connection line between the battery 191 and the power supply 193, may be omitted. The description, with reference to other figures, may similarly omit a detailed description of electrical connections between electrical components.

The rotation count units 143 and 243 may alternatively calculate the count values TC1 and TC2 based on the signals of the magnetic field detection units 132 and 232, instead of using the signals from the magnetic field detection units 131 and 231. In this case, electric power may be continuously supplied to the magnetic field detection units 132 and 232.

As described above, each of the control sections 170 and 270 may be a small computer such as a microcontroller or an SoC that includes, for example, one or more CPUs or like processor cores, memory such as read-only memory (ROM), random-access memory (RAM) and flash memory, input/output (I/O) peripherals, and a bus line for connecting these components. The processes executed by the control sections 170 and 270 may be implemented as a software process, a hardware process, or as a combination of software and hardware. The software process may be implemented by causing the CPU to execute a program or instruction set stored in memory. The program may be stored beforehand in a memory such as the ROM. The memory for storing the program/instruction set is a computer-readable, non-transitory, tangible storage medium. The hardware process may be implemented by a special purpose electronic circuit. For example, in addition to the computers that make up the control sections 170 and 270, the control sections 170 and 270 may include other hardware components that form specialized circuits for performing the processes associated with the control sections 170 and 270. Such circuits may include, for example, analog circuit components, digital circuit components, logical circuit components, or a combination of these circuit components configured to perform the processes associated with the control sections 170 and 270. In another example, the control sections 170 and 270 may include one or more specialized circuits such as application-specific integrated controllers (ASICs) or field-programmable gate arrays (FPGAs) configured to perform the processes associated with the control sections 170 and 270.

The first control section 170 and the second control section 270 are configured to communicate with each other for intercommunication between the control sections 170 and 270. The communication between the control sections 170 and 270 may be referred to as an "inter-computer communication." Any communication method such as a serial communication like SPI or SENT, CAN communication, FlexRay communication or the like may be employed for the inter-computer communication between the control sections 170 and 270.

The first control section 170 generates control signals to control the turning on and off of the switching elements 121 in the driver circuit 120 for current feedback control. The control signals for current feedback control may be based, for example, on the mechanical angle $\theta m1c$, the detection values of the current sensor (not illustrated), or other sensor signals. The second control section 270 generates control signals to control the turning on and off of the switching elements 221 in the driver circuit 220 for current feedback control. The control signals for current feedback control may be based, for example, on the mechanical angle $\theta m2c$, the detection values of the current sensor (not illustrated), or other sensor signals. When the mechanical angles are used for the current feedback control, the mechanical angles $\theta m1c$ and $\theta m2c$ are converted to electrical angles.

Figure 5:
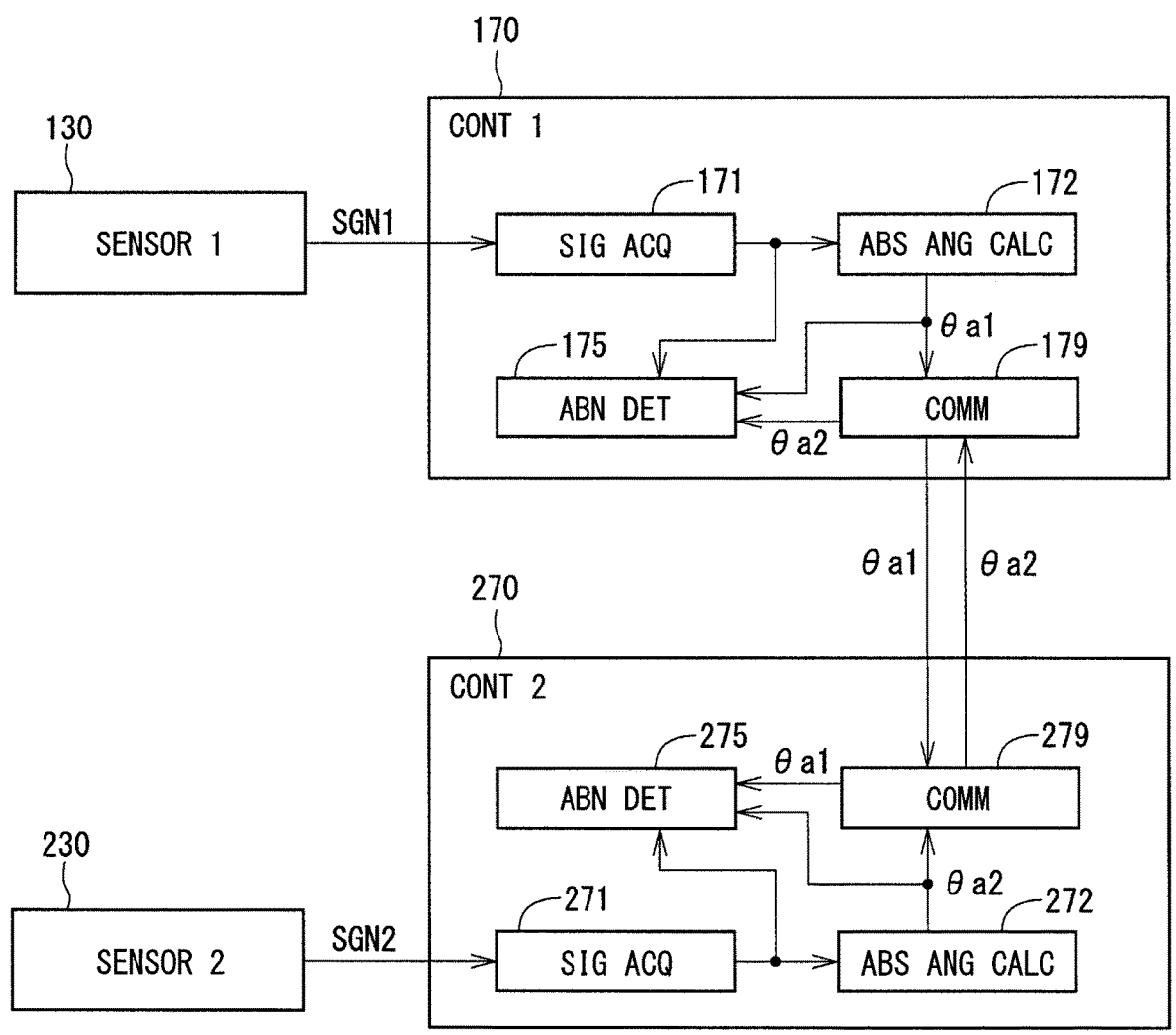
FIG. 5 illustrates a block diagram of a control section in the first embodiment.

As shown in FIG. 5, the first control section 170 includes a signal acquisition unit 171, an absolute angle calculator 172, an abnormality determiner 175, and a communicator 179. The second control section 270 includes a signal acquisition unit 271, an absolute angle calculator 272, an abnormality determiner 275, and a communicator 279.

As described above, the first control section 170 and the second control section 270 may be microcontrollers, SoCs, or like computers. The first control section 170 and second control section 270 may also include specialized circuits such as ASICs of FPGAs. The signal acquisition unit 171, absolute angle calculator 172, abnormality determiner 175, and communicator 179 elements in the first control section 170 may be realized as specialized hardware circuits (e.g., ASICs, FPGAs) configured to perform the processes associated with each of these elements. Alternatively, the processes associated with each of these elements may be performed by the control section 170 as a microcontroller, where the signal acquisition unit 171, absolute angle calculator 172, abnormality determiner 175, and communicator 179 shown in FIG. 5 represent functional blocks or processes performed by the control section 170.

The same hardware/software realization applies to the signal acquisition unit 271, absolute angle calculator 272, abnormality determiner 275, and communicator 279 elements of the second control section 270. That is, the elements of the second control section may be realized as specialized hardware circuits or represent function blocks of processes performed by the second control section 270 when these elements are realized as software, hardware, or a software/hardware combination.

The signal acquisition unit 171 acquires the first output signal SGN1 from the first sensor section 130. The signal acquisition unit 271 acquires the second output signal SGN2 from the second sensor section 230. When the first system L1 is normal, the absolute angle calculator 172 calculates the absolute angle $\theta a1$ using the mechanical angle $\theta m1c$ and the count value TC1. When the second system L2 is normal, the absolute angle calculator 272 calculates the absolute angle $\theta a2$ using the mechanical angle $\theta m2c$ and the count value TC2. By converting the absolute angles $\theta a1$ and $\theta a2$ using the gear ratio of the speed-reduction gear 89, a steering angle $\theta s$ can be calculated. The steering angle $\theta s$ is the rotation angle of the steering shaft 92. The absolute angles $\theta a1$ and $\theta a2$ may also be used to make calculations other than the steering angle $\theta s$.

The abnormality determiner 175 can determine abnormalities in the first system L1 based on the comparison result of the mechanical angles θm1c and θm1e and the self-diagnostic result acquired from the first sensor section 130. The abnormality determiner 175 can also determine abnormalities in the first system L1 by comparing the absolute angles θa1 and θa2. The abnormality determiner 275 can determine abnormalities in the second system L2 based on the comparison result of the mechanical angles θm2c, θm2e and the self-diagnostic result acquired from the second sensor section 230. The abnormality determiner 275 can also determine abnormalities by comparing the absolute angles θa1 and θa2. The communicators 179 and 279 both transmit the absolute angles θa1 and θa2 as angle information.

While the self-diagnostic units 145 and 245 of the first and second systems L1 and L2 may monitor for abnormalities in the sensor section 30 itself, the abnormality determiners 175 and 275 in the first and second control sections 170 and 270 may focus more on determining whether abnormalities exist in the absolute angles θa1 and θa2 by determining the underlying causes of the abnormalities in the absolute angles θa1 and θa2. For example, the abnormalities determiners 175 and 275 may detect abnormalities in the absolute angles θa1 and θa2 and determine that these abnormalities may be caused by signal noise, sensor errors, communication errors, or calculation errors. Such abnormalities generally cause calculation errors in the absolute angles θa1 and θa2. As such, the abnormality determiners 175 and 275 detecting and determining abnormalities may mean determining abnormalities in the calculation of the absolute angles θa1 and θa2. As described above, the abnormality determiners 175 and 275 may use abnormalities in the absolute angles θa1 and θa2 to determine abnormalities in the subject system (e.g., the first system L1 or the second system L2).

In the present embodiment, the same calculations are performed in both of the systems L1 and L2. In describing the calculations between the two systems, the calculation references may use "1" and "2" in the calculation labels to respectively distinguish between the first system L1 and the second system L2. As described above, the mechanical angles θm1c and θm2c for control may be used for various other calculations. In the description of various other calculations, the subscript "c" indicating "for control" may be omitted. The same conventions may be applied to the latter described embodiments.

Figure 6:
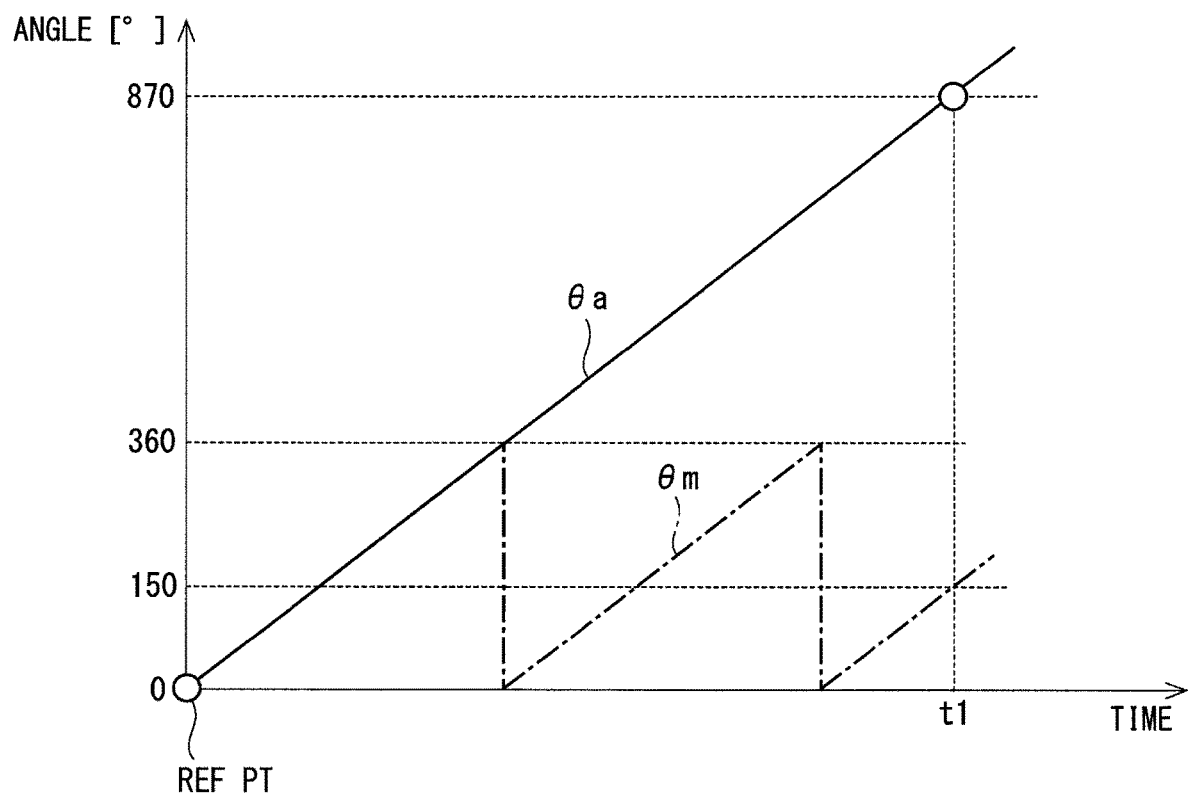
FIG. 6 is a time chart showing a mechanical angle and an absolute angle in the first embodiment.

In the present embodiment, the count value TC and the mechanical angle θm are used to calculate an absolute angle θa. The absolute angle θa is an angle to which the motor 80 is rotated with respect to a certain reference point or reference position. For example, at time t1 shown in FIG. 6, the absolute angle θa is 870° when the mechanical angle θm is 150°, assuming a reference point of 0°. The absolute angle θa is 870° since the motor 80 has already rotated twice (i.e., 720°) from the reference point of 0°. The reference point may be a point other than 0°. The absolute angle θa can be calculated using equation (1) or equation (2). For purposes of calculating using equations (1) or (2), the example assumes a count value TC of 9 and a mechanical angle θm of 150°.

$$\theta a = TC \times 90° + \text{MOD}(\theta m, 90°) \qquad \text{Equation (1)}$$

In equation (1), MOD (θm, 90°), where MOD is a modulo operation, means determining a remainder by dividing the mechanical angle θm by 90°. In this case the remainder is 60°, so MOD (150°, 90°) is 60°. Equation (1) may be described as calculating how many number of rotations have already been performed based on the count value TC to determine where the rotation is generally by determining in which one of the four regions (e.g., as shown in FIG. 7) the rotation position currently is. Equation (1) more specifically calculates where in that region the rotation position is at based on the mechanical angle θm.

$$\theta a = \text{DIV}(TC/4) \times 360° + \theta m \qquad \text{Equation (2)}$$

DIV(TC/4) in equation (2), where DIV is an integer division operation, means a quotient obtained by dividing the count value TC by 4. In this example, where the count value TC is 9, DIV(9/4) would be 2. Equation (2) determines how many times the motor 80 has rotated based on the count value TC, and then further determines the current rotation position based on the mechanical angle θm with reference to the reference point. As described above, the calculation results of equations (1) and (2) are the same. That is, either equation (1) or equation (2) may be used to calculate the absolute angle θa.

In the present embodiment, the count value TC is counted based on the output of the comparator that respectively compares each of the cos+signal, the sin+signal, the cos−signal, and the sin−signal with a threshold value TH. The count value TC may be calculated by methods other than: (i) a mutual comparison of the cos+signal, sin+signal, cos−signal, and sin−signal output signals; and (ii) a threshold comparison using a logical operation of the cos+signal, sin+signal, cos−signal, and sin−signal output signals.

During the counting of the count value TC, the count value TC may deviate from the true or actual count value TC due to deviations in the threshold value TH or sensor signal errors. As shown in FIG. 7, indefinite regions "Ri" may be designated as regions where the counting up or counting down of the count value may be performed. The indefinite region Ri is a region where the count value TC may deviate from an actual, true value depending on whether the counting up or the counting down of the count value TC has already occurred. The definite regions "Rd" (e.g., Rd0, Rd1) are regions where the count value TC can be definitely determined, and the counting up or the counting down of the count value is not performed. In FIG. 7, the indefinite regions Ri are shown with a dot hatching. The definite region within the region R0 is designated as Rd0, the definite region within the region R1 is designated as Rd1, the definite region within the region R2 is designated as Rd2, and the definite region within the region R3 is designated as Rd3.

In the present embodiment, the absolute angle calculation, as calculated by equation (1) or equation (2) using the mechanical angle θm and the count value TC in the definite region Rd, is performed by the absolute angle calculator 172 and 272 immediately after the vehicle is turned on (i.e., immediately after the ignition or start switch of the vehicle is turned on). In the second and subsequent calculations, the absolute angle θa is calculated by adding a difference of mechanical angle θm values. More specifically, the absolute angle calculator 172 calculates the current absolute angle θa(n) based on the previous value of the absolute angle θa(n−1) and the change amount of the mechanical angle θm, that is, the difference between a current mechanical angle value θm(n) and the previous mechanical angle value θm(n−1). The second and subsequent calculations of the absolute angle θa may be calculated using equation (3). The absolute angle θa may be stored memory for use in the second and subsequent calculations using equation (3). That is, the calculated absolute angle θa may be continually updated and stored in memory for use as the previous absolute angle θa(n−1) for use in calculating the current absolute angle θa. The absolute angle θa may be calculated by adding the mechanical angle difference to the previously calculated absolute angle. In equation (3), the suffix (n) denotes the current value while the suffix (n−1) denotes the previous value.

$$\theta a(n)=\theta a(n-1)+(\theta m(n)-\theta m(n-1)) \qquad \text{Equation (3)}$$

Figure 8:
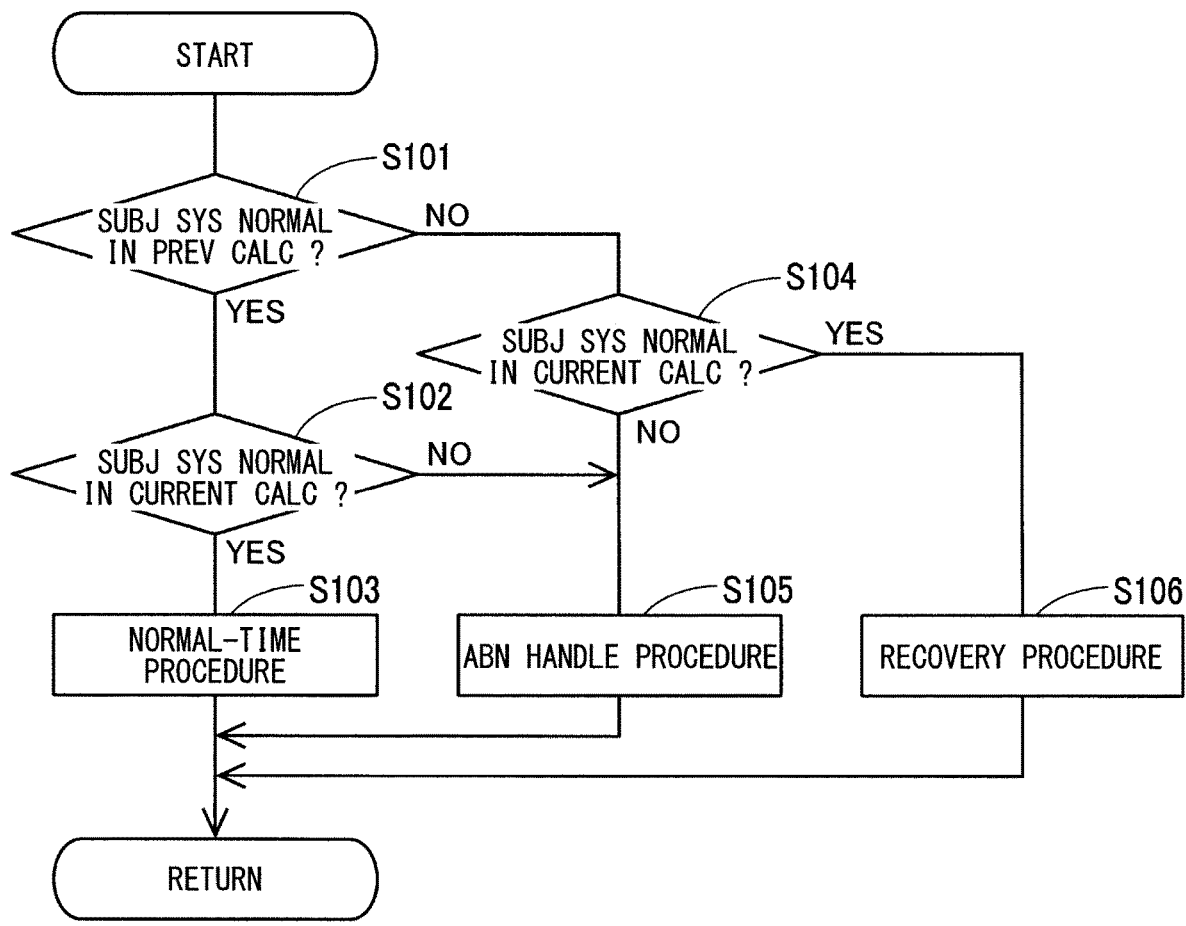
FIG. 8 is a flowchart showing an absolute angle calculation process in the first embodiment.

The absolute angle calculation process in the present embodiment is described with reference to the flowchart in FIG. 8. The absolute angle calculation process is executed by the absolute angle calculators 172 and 272 at a predetermined cycle. The absolute angle calculation processes by the absolute angle calculators 172 and 272 are similar to each other. That is, if the values of the first system L1 and the values of the second system L2 are interchanged, the absolute angle calculator 172 would make the same calculations with the values of the second system L2 as the absolute angle calculator 272. As such, the process shown in FIG. 8 is described with reference to the absolute angle calculator 172 and the first system L1, but the process may be applied to the absolute angle calculator 272 and the second system L2 as well.

At S101, the absolute angle calculator 172 determines whether the first system L1 (i.e., the subject system) was normal during the previous calculation. If the absolute angle calculator 172 determines that the subject system was abnormal during the previous calculation, i.e., "NO" at S101, the process proceeds to S104. If the absolute angle calculator 172 determines that the subject system was normal during the previous calculation, i.e., "YES" at S101, the process proceeds to S102.

At S102, the absolute angle calculator 172 determines whether the subject system is normal for the current calculation. When the absolute angle calculator 172 determines that the subject system is abnormal during the current calculation, i.e., "NO" at S102, the process proceeds to S105. When the absolute angle calculator 172 determines that the subject system is normal during the current calculation, i.e., "YES" at S102, the process proceeds to S103. At S103, the absolute angle calculator 172 calculates the absolute angle $\theta a1$ using equation (3) with the values of the subject system that are measured and calculated during normal operation of the subject system (i.e., normal time values). The count value TC1, the mechanical angle $\theta m1$, and the calculated absolute angle $\theta a1$ are stored in memory such as RAM as normal time values.

The stored normal time values are set as hold values, for example, a count hold value TC1_hold, a mechanical angle hold value $\theta m1\_hold$, and an absolute angle hold value $\theta a1\_hold$. Some of the values to be held in memory (i.e., the hold values) may be omitted depending on the abnormality handling procedure and the recovery procedure.

At S104, similar to S102, the absolute angle calculator 172 determines whether the subject system is normal during the current calculation. When the absolute angle calculator 172 determines that the subject system is abnormal, i.e., "NO" at S104, the process proceeds to S105. When the absolute angle calculator 172 determines that the subject system is normal, i.e., "YES" at S104, the process proceeds to S106.

At S105, the absolute angle calculator 172 performs an abnormality handling procedure. In the abnormality handling procedure, the absolute angle calculator uses the absolute angle hold value $\theta a1\_hold$ stored in memory as the absolute angle $\theta a1$. The absolute angle hold value $\theta a1\_stored$ in memory before the abnormality detection is kept unchanged. Alternatively, the absolute angle calculator 172 may use the absolute angle $\theta a2$ from the other system (i.e., the second system L2) as the absolute angle $\theta a1$ if the other system is normal.

At S106, as a recovery procedure, the absolute angle calculator 172 calculates a recovery-time absolute angle $\theta a1\_r$. In the present embodiment, the recovery-time absolute angle $\theta a1\_r$ is derived by adding a mechanical angle change amount $\Delta\theta m1$ to the absolute angle hold value $\theta a1\_hold$, as shown in equation (4). The mechanical angle change amount $\Delta\theta m1$ is the amount of change in the mechanical angle $\theta m1$ during the abnormality detection. The mechanical angle change amount $\Delta\theta m1$ is derived by subtracting a mechanical angle hold value $\theta m1\_in$ memory from the recovery-time mechanical angle $\theta m1\_r$, as shown in equation (5). The mechanical angle hold value $\theta m1$ is the mechanical angle held in memory before the abnormality detection, and the recovery-time mechanical angle $\theta m1\_r$ is the mechanical angle measured/calculated when the subject system recovers to normal after the abnormality occurrence.

$$\theta a1\_r=\theta a1\_\text{hold}+\Delta\theta m1 \qquad \text{Equation (4)}$$

$$\Delta\theta m1=\theta m1\_r-\theta m1\_\text{hold} \qquad \text{Equation (5)}$$

Figure 9:
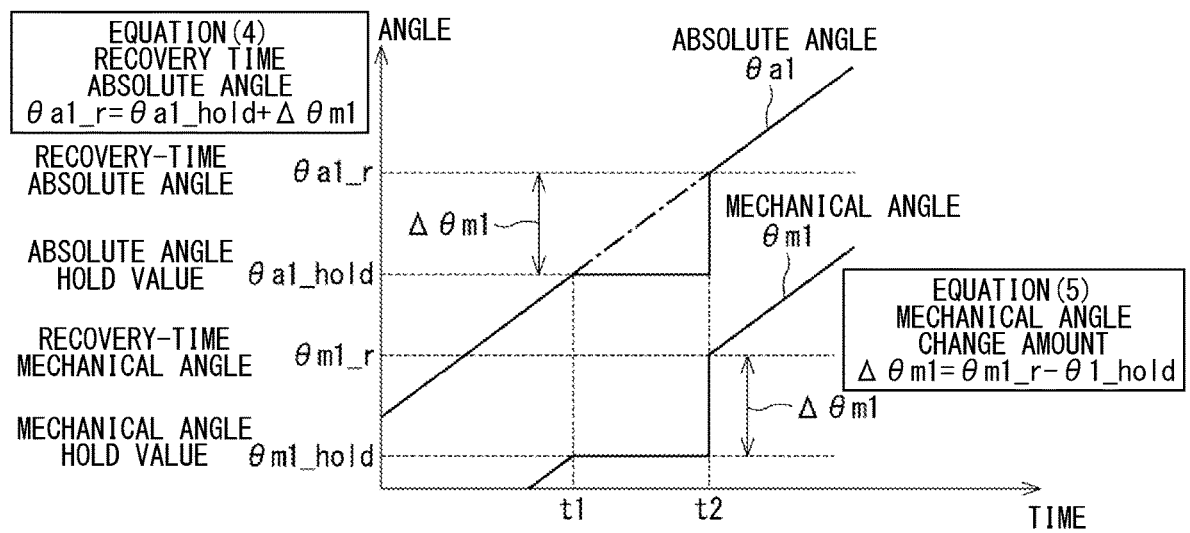
FIG. 9 is a time chart of an abnormality handling procedure and a recovery procedure in the first embodiment.

The time chart of FIG. 9 illustrates an example of an abnormality that occurs in the subject system at time t1 and the recovery of the subject system from the abnormality at time t2. In FIG. 9, the horizontal axis in the time chart represents time and the vertical axis represents angle. When an abnormality occurs at time t1, the normal time absolute angle $\theta a1$ and the normal time mechanical angle $\theta m1$ are stored respectively as the absolute angle hold value $\theta a1\_hold$ and the mechanical angle hold value $\theta m1\_hold$. In FIG. 9, the normal time of the subject system is the time up until time t1 when the abnormality occurs. During the abnormality handling procedure, the absolute angle calculator 172 continuously uses the absolute angle hold value $\theta a1\_hold$ as the absolute angle $\theta a1$ during the period from time t1 to time t2. If, alternatively, the absolute angle calculator 172 uses the absolute angle $\theta a2$ as the absolute angle $\theta a1$ during the occurrence of the abnormality, the value of the absolute angle $\theta a2$ is shown in FIG. 9 from time t1 to time t2 as a one-dot-one-dash line. While the absolute angle $\theta a2$ may be used in place of the absolute angle hold value $\theta a1$ for the absolute angle $\theta a1$ during the occurrence of the abnormality in the subject system, using the absolute angle $\theta a2$ assumes that there are no inter-system errors between the L1 and L2 systems, and that the other system (i.e. the second system L2) is operating normally.

When the subject system returns to the normal state at time t2, the absolute angle calculator 172 calculates the recovery-time absolute angle $\theta a1\_r$ using equation (4). After the subject system recovers from the abnormality at time t2, the absolute angle calculator 172 calculates the absolute angle $\theta a1$ using the normal time procedure (e.g., using equation (3)). That is, the absolute angle calculator 172 resumes normal absolute angle calculation. Thus, if the change in the rotation angle (e.g, $\Delta\theta m1$) from abnormality detection to recovery is less than 180°, the absolute angle calculator 172 can calculate the absolute angle $\theta a1$ in the post recovery time (e.g., after time t2) with the same accuracy as the absolute angle calculations before the abnormality occurred (e.g., before time t1). That is, the after-recovery accuracy of the absolute angle calculation is the same as the pre-abnormality calculation accuracy.

As described above, the ECU 10 configured as the rotation detection device in the present embodiment includes the sensor sections 130 and 230 and the control sections 170 and 270. The sensor sections 130 and 230 detect the rotation of the motor 80, and output rotation information on the mechanical angles $\theta m1$ and $\theta m2$ and the number of rotations of the motor. The mechanical angles $\theta m1$ and $\theta m2$ may also be referred to as both a "rotation angle" and "first rotation information." Second rotation information may refer to the count values TC1 and TC2.

The control sections 170 and 270 include the signal acquisition units 171 and 271, the absolute angle calculators 172 and 272, the abnormality determiners 175 and 275, and the communicators 179 and 279. The signal acquisition units 171 and 271 acquire the mechanical angles $\theta m1$ and $\theta m2$ and the count values TC1 and TC2 from the sensor sections 130 and 230. The absolute angle calculators 172 and 272 calculate the absolute angles $\theta a1$ and $\theta a2$, which are the rotation amounts from the reference position, based on the mechanical angles $\theta m1$ and $\theta m2$ and the count values TC1 and TC2. The abnormality determiners 175 and 275 determine abnormalities in the absolute angles $\theta a1$ and $\theta a2$. In other words, the abnormality determiners 175 and 275 determine whether the absolute angles $\theta a1$ and $\theta a2$ are abnormal. Abnormalities in the absolute angles $\theta a1$ and $\theta a2$ may include abnormalities in the values used to calculate the absolute angles $\theta a1$ and $\theta a2$, such as abnormalities in the mechanical angles $\theta m1$ and $\theta m2$, and abnormalities in the count values TC1 and TC2. The communicators 179 and 279 transmit and receive the absolute angle information related to the absolute angles $\theta a1$ and $\theta a2$.

When abnormalities occur in the absolute angle $\theta a1$, the absolute angle calculator 172 uses the absolute angle hold value $\theta a1\_hold$ stored in memory, where the absolute angle hold value $\theta a1\_hold$ is an absolute angle $\theta a1$ value calculated and stored to memory during the normal time before the abnormality detection. When the abnormalities in the absolute angle $\theta a1$ are eliminated and resolved, and the absolute angle $\theta a1$ and the subject system (i.e., L1) recover to the normal state, the absolute angle calculator 172 returns to the normal-time absolute angle calculation after calculating the recovery-time absolute angle $\theta a1\_r$.

The control section 170 and the sensor section 130 combine to calculate the absolute angles in the first system L1, and the control section 270 and the sensor section 230 combine to calculate the absolute angles in the second system L2. The absolute angle in a subject system is designated as the subject system absolute angle and the absolute angle acquired from the other system is designated as the other system absolute angle. The above-described example assumes the first system L1 is the subject system, where the subject system absolute angle is the absolute angle $\theta a1$ and the other system absolute angle is the absolute angle $\theta a2$. When an abnormality occurs in the absolute angle $\theta a1$, the absolute angle calculator 172 either (i) uses the absolute angle hold value $\theta a1\_hold$ stored in memory before the abnormality detection as the value for the absolute angle $\theta a1$, or (ii) alternatively uses the other system absolute angle $\theta a2$ acquired from the other system as the value for the absolute angle $\theta a1$.

As a result of using the alternate absolute angle values, the rotation detection device 10 of the current embodiment can calculate the absolute angle $\theta a1$ without interruption even when abnormalities occur. The rotation detection device 10 of the current embodiment is further enabled to appropriately recover from an abnormal state by calculating the recovery-time absolute angle $\theta a1\_r$. In such manner, the rotation detection device 10 is able to recover from temporary abnormalities in the absolute angle that may be caused by communication errors and signal noise between the sensor sections 130 and 230 and the control sections 170 and 270.

In the present embodiment, the absolute angle calculator 172 calculates the recovery-time absolute angle $\theta a1\_r$ based on (i) the absolute angle hold value $\theta a1\_hold$ and (ii) the mechanical angle change amount $\Delta\theta m1$. The absolute angle calculator 272 can calculate the recovery-time absolute angle $\theta a2\_r$ in the second system L2 in a like manner.

The electric power steering apparatus 8 includes the ECU 10 and the motor 80 that outputs an assist torque to assist a steering operation of the vehicle. Since the absolute angle $\theta a$ is calculated by the ECU 10 of the present embodiment, the ECU 10 can also calculate the steering angle by converting the absolute angle $\theta a$ with the gear ratio of the speed-reduction gear 89 that transmits the output of the motor 80 to the steering system 90. In such manner, the ECU 10 acts like a steering angle sensor and the electric power steering apparatus 8 including the ECU 10 of the present embodiment can omit a steering angle sensor. Since the ECU 10 is enabled to appropriately calculate the absolute angle $\theta a$ during abnormalities, the ECU 10 can also calculate the steering angle during abnormalities.

Second Embodiment

Figure 10:
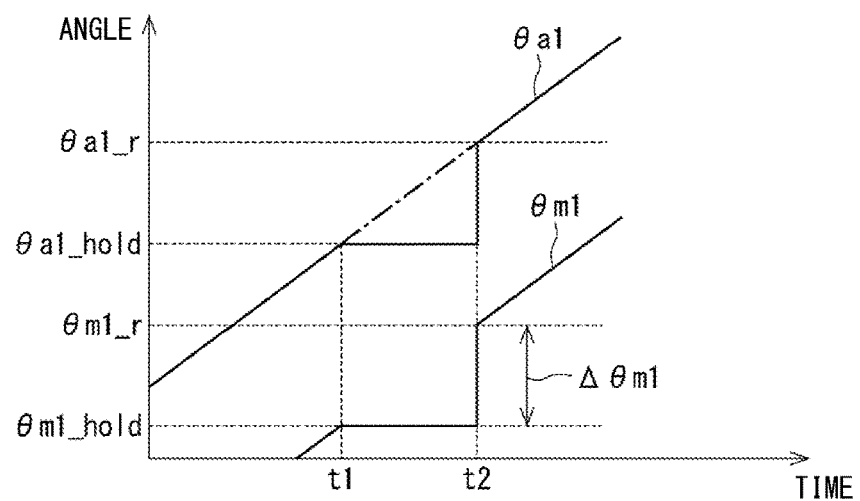
FIG. 10 is a time chart of an abnormality handling procedure and a recovery procedure according to a second embodiment.

The second embodiment is described with reference to FIG. 10.

The second, third, fourth, and fifth embodiments describe recovery procedures that differ from the recovery procedure in the first embodiment. As such, the descriptions of the second, third, fourth, and fifth embodiments focus primarily on the differences in the recovery procedure. Unless described otherwise, the structural elements, components, features, and arrangements of the second, third, fourth, and fifth embodiments may be the same as those of the first embodiment, for example, as shown in, and described with reference to FIGS. 1-5. As such, like elements, components, and features in the following embodiments may be described by the same reference characters used in the first embodiment, and repeat descriptions of the previously described like elements, components, and features may be omitted from the descriptions of the following embodiments. Similar to the description of the first embodiment, the following embodiments describe calculations in the first system L1 and omit a description of the calculations in the second system L2. In the following embodiments, the calculations for the first system L1 may be applied to the second system L2 in a like manner using values calculated and measured from the second system L2 or values supplied by the first system L1.

In FIGS. 10, 11, 12, and 13, the procedure up to time t2 is the same as the procedure up to time t2 in the first embodiment, as described with reference to FIG. 9.

In the present embodiment, for the recovery procedure at time t2, the absolute angle calculator 172 uses the recovery-time count value $TC1\_r$ and the recovery-time mechanical angle $\theta m1\_r$ for recalculating the absolute angle. That is, the absolute angle calculator 172 calculates the recovery-time absolute angle $\theta a1\_r$ at time t2 using equation (1) or (2), where the recovery-time values are substituted for the corresponding values in equations (1) and (2) (e.g., using the recovery-time mechanical angle $\theta m1\_r$ in place of the mechanical angle $\theta m$). The control section 170 may compare the recovery-time absolute angle $\theta a1\_r$ and the absolute angle $\theta a2$ of the second system to determine whether the recovery-time absolute angle $\theta a1\_r$ and the absolute angle $\theta a2$ are equal to one another. The equality of the recovery-time absolute angle θa1_r and the absolute angle θa2 provides the control section 170 with a "normal" indication to indicate that the recovery from the abnormality can be appropriately performed at time t2. The control section 170 can then calculate the absolute angle θa1 by adding the change amount of the mechanical angle θm1 to the recovery-time absolute angle θa1_r. By adopting such a configuration, the control section 170 can continue to calculate the absolute angle θa1 with the same accuracy after the recovery to the normal state as before the abnormality detection.

In the present embodiment, the absolute angle calculator 172 calculates the absolute angle θa1 based on the mechanical angle θm1 and the count value TC1 in the first calculation, and then calculates the absolute angle θa1 based on the value from the first calculation and the mechanical angle θm1 in the subsequent calculations. After detecting the abnormality, and after the abnormality is resolved, the absolute angle θa1 is recalculated using the mechanical angle θm1 and the count value TC1 in the same manner as the first calculation, and the recalculated absolute angle θa1 is used as the recovery-time absolute angle θa1_r. In such manner, the control section 170 and the absolute angle calculator 172 can use the above-described recovery procedure to appropriately calculate the recovery-time absolute angle θa1_r. Such recovery procedure may also be applied to and used by the second system L2. The present embodiment also achieves the same advantageous effects as those described in the preceding embodiment.

Third Embodiment

Figure 11:
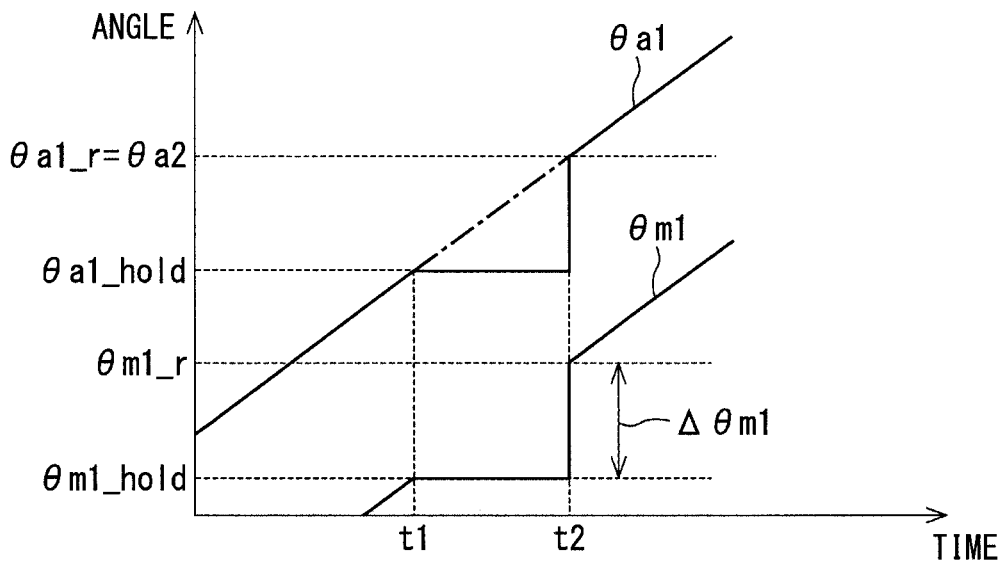
FIG. 11 is a time chart of an abnormality handling procedure and a recovery procedure according to a third embodiment.

The third embodiment is shown in FIG. 11. In FIG. 11, for the recovery procedure at time t2, the absolute angle θa2 of the second system is used as the recovery-time absolute angle θa1_r at time t2. The change amount of the mechanical angle θm1 is then added to the recovery-time absolute angle θa1_r in subsequent calculations to calculate the absolute angle θa1. In the present embodiment, the recovery-time absolute angle θa1_r is set as the absolute angle θa2 of the second system. As such, the control section 170 of the present embodiment does not perform an inter-system comparison, which makes it possible to shorten the time for the recovery procedure.

In the present embodiment, the absolute angle calculator 172 sets the absolute angle θa2 of the other system as the recovery-time absolute angle θa1_r at the recovery time. In this manner, the control section 170 and the absolute angle calculator 172 can appropriately set the recovery-time absolute angle θa1_r. Such a configuration also achieves similar advantageous effects as those described in the preceding embodiments.

Fourth Embodiment

Figure 12:
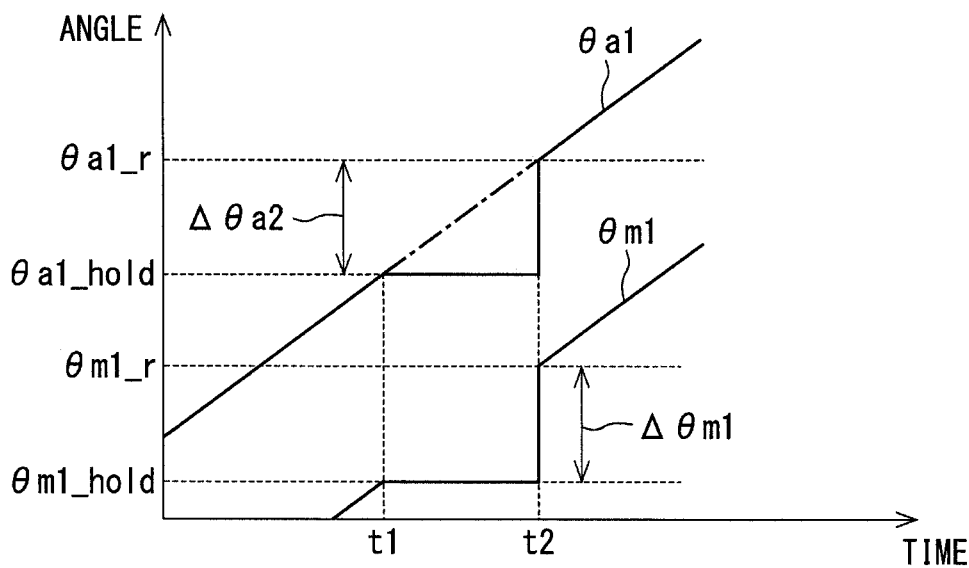
FIG. 12 is a time chart of an abnormality handling procedure and a recovery procedure according to a fourth embodiment.

The fourth embodiment is shown in FIG. 12. In FIG. 12, in the recovery procedure at time t2, the absolute angle calculator 172 calculates the recovery-time absolute angle θa1_r based on the absolute angle hold value θa1_hold of the subject system and an absolute angle difference value Δθa2 of the other system, as shown in equation (6). The absolute angle difference value Δθa2 is a difference value between the absolute angle hold value θa2_hold calculated when the other system L2 is normal (i.e., at normal time) and the recovery-time absolute angle θa2_r, as shown in equation (7).

$$θa1\_r = θa1\_hold + Δθa2 \quad \text{Equation (6)}$$

$$Δθa2 = θa2\_r - θa2\_hold \quad \text{Equation (7)}$$

The control sections 170 and 270 do not perform an inter-system comparison in such a configuration making the recovery time shorter than other embodiments. In addition, since a value from the other system is a difference value, it prevents or at least reduces the influence of the inter-system error caused by, for example, detection errors, communication delays, and signal noise.

In the present embodiment, the absolute angle calculator 172 calculates the recovery-time absolute angle θa1_r based on (i) the absolute angle hold value θa1_hold, which is the absolute angle of the subject system before the abnormality detection, and (ii) the absolute angle difference value Δθa2, which is the difference between the two absolute angle hold values θa2_hold in the other system before abnormality detection and the recovery time. In such configuration, the control section 170 and the absolute angle calculator 172 can appropriately calculate the recovery-time absolute angle θa1_r. Such a recovery procedure may also be applied to, and used by, the second system L2. The present embodiment also achieves the same advantageous effects as those described in the preceding embodiments.

Fifth Embodiment

Figure 13:
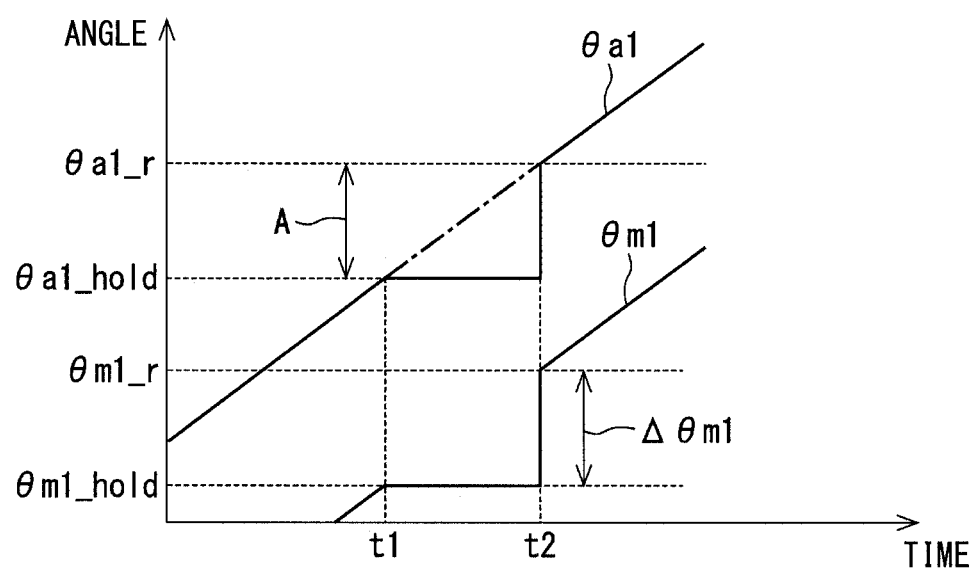
FIG. 13 is a time chart of an abnormality handling procedure and a recovery procedure according to a fifth embodiment.

The fifth embodiment is shown in FIG. 13. In FIG. 13, the absolute angle calculator 172 calculates the recovery-time absolute angle θa1_r based on (i) the absolute angle hold value θa1_hold of the subject system, and (ii) an angle correction value A of the subject system. The recovery procedure absolute angle calculations performed by the absolute angle calculator 172 at time t2 are given by equations (8) and (9).

$$θa1\_r = θa1\_hold + A \quad \text{Equation (8)}$$

$$A = DIV\{Δθa2/360\} \times 360 + (θm1\_r - θm1\_hold) \quad \text{Equation (9)}$$

In such a configuration, the control sections 170 and 270 do not perform an inter-system comparison, which makes it possible to shorten the time for performing the recovery procedure. Also, since the angle correction value is derived by dividing the absolute angle difference value Δθa2 of the other system L2 by 360, the number of rotations N is extracted from the absolute angle θa2 of the other system during the abnormality handling of the subject system L1. As such, the absolute angle calculator 172 can calculate the post-recovery absolute angle θa1 with the same calculation accuracy as the absolute angle calculations before the abnormality occurs, because the number of rotations N has a low susceptibility to inter-system error.

In the present embodiment, the absolute angle calculator 172 calculates the recovery-time absolute angle θa1_r based on (i) the absolute angle hold value θa1_hold, which is the absolute angle of the subject system L1 before the abnormality detection; (ii) the absolute angle difference value Δθa2, which is the difference of the absolute angles in the other system L2 (a) before the abnormality detection and (b) at the recovery time; and (iii) the mechanical angle change amount Δθm1, which is the difference of the mechanical angles in the subject system L1 (a) before the abnormality detection and (b) at the recovery time. More specifically, the absolute angle calculator 172 calculates the recovery-time absolute angle θa1_r based on (i) the absolute angle hold value θa1_hold of the subject system L1, (ii) a rotation number conversion value of the other system L2 based on the absolute angle difference value Δθa2, and (iii) the mechanical angle change amount Δθm1 in the subject system L1. By using such a configuration, the control section 170 and the absolute angle calculator 172 can appropriately calculate the recovery-time absolute angle θa1_r. Such a recovery procedure may also be applied to, and used by, the second system L2. The present embodiment also achieves the same advantageous effects as those described in the preceding embodiments.

Other Embodiments

In the above-described embodiments, the first rotation information is a mechanical angle and the second rotation information is a count value. In other embodiments, the first rotation information may be any value that can be converted to a mechanical angle. In other embodiments, the second rotation information may be any value that can be converted to the number of rotations. In the above-described embodiments, one rotation is divided into four regions, and the count value for one rotation of the motor is four. In other embodiments, one rotation may be divided into different numbers such as three, five, or more. In other embodiments, the mechanical angle may be corrected by offset correction to avoid the switching position of the mechanical angle from 360° to 0° from being positioned within the indefinite region.

In the above-described embodiments, two sensor sections and two control sections are provided for a dual system configuration. In other embodiments, the number of systems may be three or more, or one. A plurality of sensor sections may be provided for one control section. In such a case, the absolute angle calculator may be provided internally for each sensor section, and the combination of the sensor section and the absolute angle calculator may be considered as a "system."

In the above-described embodiments, electric power is supplied to the first sensor section and the second sensor section from two separate batteries, and an output signal is transmitted from two sensor sections to two separate control sections. In other embodiments, electric power may be supplied from a single battery to a plurality of sensor sections. In such a case, a power source such as a regulator may be provided for each sensor section or may be shared among the sensor sections. In other embodiments, a plurality of sensor sections may respectively transmit an output signal to a single control section.

In other embodiments, the absolute angle information may be any value that can be converted to an absolute angle. For example, since the steering angle detected by the steering angle sensor can be converted into the absolute angle by the gear ratio of the speed-reduction gear, the steering angle information on the steering angle may be used as the absolute angle information. That is, in other words, the other system absolute angle is not necessarily limited to internal information obtained from inside the rotation detection device, but may also be obtained from outside the rotation detection device (e.g., an externally obtained value).

In the above-described embodiments, the sensor section is a detection element that detects a change in the magnetic field of the magnet. In other embodiments, other rotation angle detection methods and devices may be used such as a resolver or an inductive sensor. In addition, a communicator may be provided for transmitting each type of information type. For example, a first communicator may be provided for transmitting the first rotation information and a second communicator may be provided for transmitting the second rotation information.

In the above-described embodiments, the rotation number calculation is not performed based on the signal from the magnetic field detection unit for abnormality detection. In other embodiments, the rotation number calculation may be performed based on the signal from the magnetic field detection unit for abnormality detection, and the calculation result may be transmitted to the control section. In such manner, the inter-system correction and/or the abnormality monitoring by an inter-system comparison for the second system can be omitted.

In the above-described embodiments, the motor is a three-phase brushless motor. In other embodiments, the motor is not limited to a permanent magnet-type three phase brushless motor, and may be implemented as a motor of any type. The motor may also be a generator, or may be a motor-generator having both of a motor function and a generator function. That is, the rotating electric machine is not necessarily limited to a motor, but may be a motor, a generator, or a motor-generator.

In the above-described embodiments, a control device having the rotation detection device is applied to an electric power steering apparatus. In other embodiments, the control device having the rotation detection device may be applied to apparatuses other than an electric power steering apparatus.

The present disclosure is not limited to the embodiments described above, and various modifications may be implemented without departing from the spirit of the present disclosure.

What is claimed is:
1. A rotation detection device for a motor of an electric power steering apparatus that outputs a steering torque for assisting a steering operation of a vehicle, the rotation detection device comprising:
a sensor section configured to detect a rotation of a shaft of the motor by detecting changes in a magnetic field that is caused by rotation of a magnet on the shaft of the motor, the sensor section configured to output first rotation information that includes a rotation angle of the motor within one rotation of the motor and second rotation information that includes a number of rotations of the motor; and
a control section including:
a signal acquirer configured to acquire the first rotation information and the second rotation information from the sensor section;
an absolute angle calculator configured to calculate an absolute angle indicative of a rotation amount from a reference position based on the first rotation information and the second rotation information;
an abnormality determiner configured to determine an abnormality in a calculation of the absolute angle; and
a communicator configured to transmit and receive absolute angle information for the absolute angle, wherein
the absolute angle calculator, in response to the abnormality in the calculation of the absolute angle, is further configured to use a pre-abnormality value of the absolute angle to calculate the absolute angle, the pre-abnormality value of the absolute angle being calcu- lated before the abnormality in the calculation of the absolute angle occurs, and wherein the absolute angle calculator is further configured to recover from the abnormality in the calculation of the absolute angle after calculating a recovery-time absolute angle and to resume normal absolute angle calculation, the recovery-time absolute angle calculated based on a difference between a rotation angle that is stored in memory before the abnormality is determined and a rotation angle measured when normal absolute angle calculation resumes wherein the motor outputs the steering torque for assisting the steering operation of the vehicle based on a steering angle calculated from the absolute angle.

2. The rotation detection device of claim 1, wherein the sensor section and the control section are combined as a system, and wherein the rotation detection device includes at least two sensor section and control section systems, and wherein the absolute angle is designated either as
- a subject system absolute angle when the absolute angle is calculated by a subject system, or
- an other system absolute angle when the absolute angle is calculated by an other system other than the subject system, and wherein the absolute angle calculator, in response to the abnormality in the calculation of the absolute angle, is further configured to either use a pre-abnormality value of the absolute angle to calculate the absolute angle or use the other system absolute angle to calculate the absolute angle.

3. The rotation detection device of claim 2, wherein the absolute angle calculator is further configured to calculate the recovery-time absolute angle based on (i) the pre-abnormality value of the absolute angle of the subject system, and (ii) a difference between the pre-abnormality value of the absolute angle of the other system and the recovery-time absolute angle of the other system.

4. The rotation detection device of claim 2, wherein the absolute angle calculator is further configured to calculate the recovery-time absolute angle based on (i) the pre-abnormality value of the absolute angle of the subject system, (ii) a difference between the pre-abnormality value of the absolute angle of the other system and the recovery-time absolute angle of the other system, and (iii) a difference between the rotation angle of the subject system that is stored in memory before the abnormality is determined and the rotation angle of the subject system when normal absolute angle calculation resumes.

5. The rotation detection device of claim 2, wherein the absolute angle calculator is further configured to use the recovery-time absolute angle of the other system as the recovery-time absolute angle.

6. The rotation detection device of claim 2, wherein the absolute angle calculator is further configured to calculate the recovery-time absolute angle based on (i) the value of the absolute angle of the subject system, and (ii) a difference between the pre abnormality rotation angle of the subject system that is stored in memory before the abnormality is determined and the rotation angle of the subject system when normal absolute angle calculation resumes.

7. The rotation detection device of claim 1, wherein the absolute angle calculator is further configured to calculate the absolute angle based on the first rotation information and the second rotation information in a first calculation, and wherein the absolute angle calculator is further configured to calculate the absolute angle based on the absolute angle in the first calculation and the first rotation information in subsequent calculations, the subsequent calculations subsequent to the first calculation, and wherein the absolute angle calculator is further configured to use the absolute angle calculated based on the first rotation information and the second rotation information as the recovery-time absolute angle.

8. An electric power steering apparatus that outputs a steering torque for assisting a steering operation of a vehicle, the electric power steering apparatus comprising:

a motor for outputting the steering torque for assisting the steering operation of the vehicle;

a rotation detection device comprising:

a sensor section configured to detect a rotation of a shaft of the motor by detecting changes in a magnetic field that is caused by rotation of a magnet on the shaft of the motor, and the sensor section configured to output first rotation information that includes a rotation angle of the motor in one rotation of the motor and second rotation information that includes a number of rotations of the motor; and a control section including:

a signal acquirer configured to acquire the first rotation information and the second rotation information from the sensor section;

an absolute angle calculator configured to calculate an absolute angle indicative of a rotation amount from a reference position based on the first rotation information and the second rotation information;

an abnormality determiner configured to determine an abnormality in a calculation of the absolute angle; and a communicator configured to transmit and receive absolute angle information for the absolute angle, wherein the absolute angle calculator, in response to the abnormality in the calculation of the absolute angle, is further configured to use a pre-abnormality value of the absolute angle to calculate the absolute angle, the pre-abnormality value of the absolute angle being calculated before the abnormality in the calculation of the absolute angle occurs, and wherein the absolute angle calculator is further configured to recover from the abnormality in the calculation of the absolute angle after calculating a recovery-time absolute angle and to resume normal absolute angle calculation, the recovery-time absolute angle calculated based on a difference between a rotation angle that is stored in memory before the abnormality is determined and a rotation angle measured when normal absolute angle calculation resumes wherein the motor outputs the steering torque for assisting the steering operation of the vehicle based on a steering angle calculated from the absolute angle.

* * * * *